Aug. 29, 1944.                L. B. WACKMAN                2,356,901
METHOD OF CONSTRUCTING BUSHING FIXTURES FOR METALLIC CONTAINERS
                            Filed Aug. 30, 1940
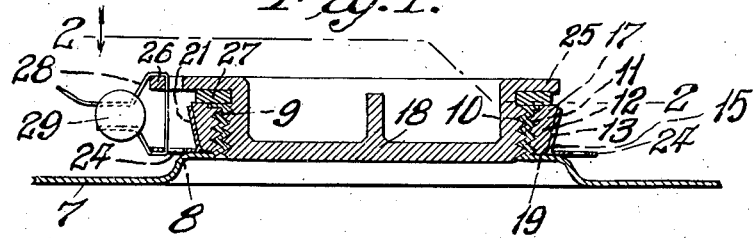
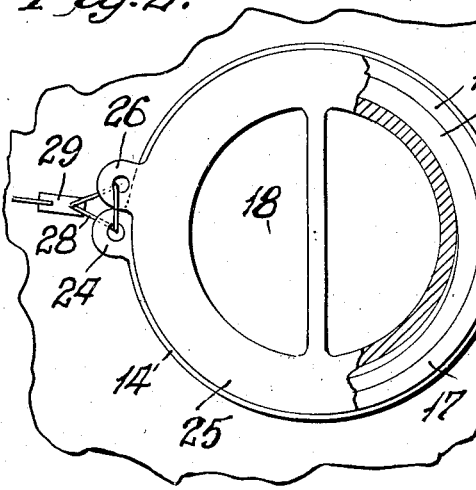
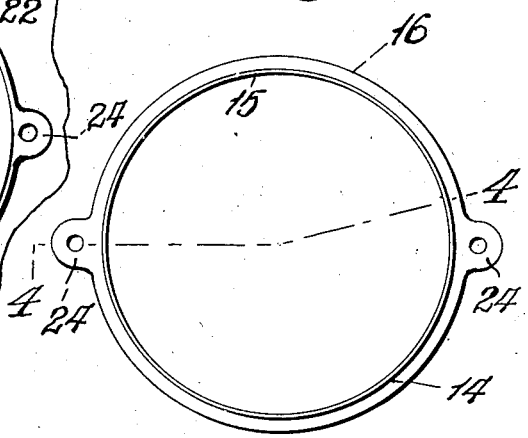
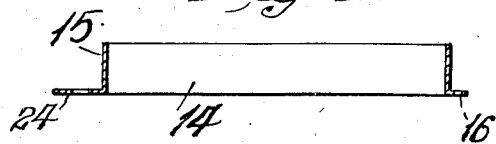
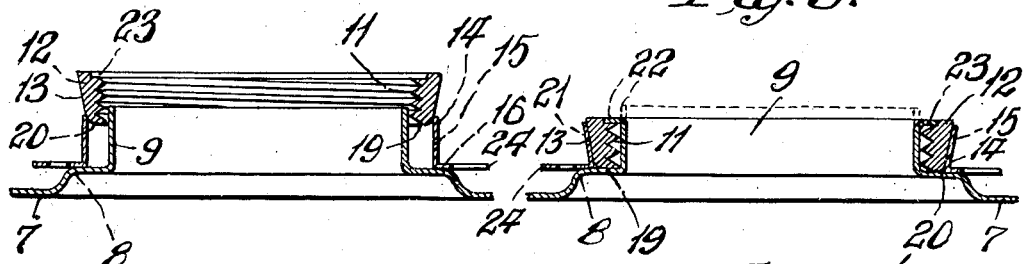
Inventor:
Louis B. Wackman
By Herbert G. Fletcher
                atty.

Patented Aug. 29, 1944

2,356,901

UNITED STATES PATENT OFFICE 2,356,901

METHOD OF CONSTRUCTING BUSHING FIXTURES FOR METALLIC CONTAINERS

Louis B. Wackman, Richmond Heights, Mo.

Application August 30, 1940, Serial No. 354,904

4 Claims. (Cl. 29—148.2)

This invention relates to a sealing ring for a bung or plug of a sheet metal container and discloses a method of securing the sealing ring to the bushing fixture of the plug for the application and use of a sealing wire or the like.

The primary object of the invention is to provide a method of making the plug bushing fixture of a construction for cooperation with the wire sealing ring for securing the ring to the bushing fixture in an improved manner.

Another object is to provide the outer surface of a shape to engage and sustain the sealing ring in position against removal from the fixture.

A further object is to provide the sealing ring with a flared wall for permanently securing it to the fixture so as to form a part thereof.

A still further object is to outwardly flare an annular wall of the sealing ring for securing it to the fixture so that it cannot be removed therefrom.

Another further object is to apply the sealing ring to the bushing fixture during construction of the fixture on a sheet metal wall of the container.

Still another object is to include the application of the sealing ring to the bushing fixture as a step in the assembly of the fixture.

With the foregoing and other objects in view which will appear as the description proceeds, my invention resides in the combination and arrangement of parts and in the details of construction hereinafter described and claimed, it being understood that changes may be made within the scope of what is claimed without departing from the spirit of the invention.

An embodiment of the invention is illustrated in the accompanying drawing, wherein:

Figure 1 is a transverse vertical sectional elevation taken through a fragmentary portion of a sheet metal container wall and showing the invention applied thereto.

Figure 2 is a plan elevation of Fig. 1, taken approximately on the line 2—2 thereof and partly shown in section.

Figure 3 is a plan elevation of the wire sealing ring.

Figure 4 is a transverse sectional elevation taken approximately on the line 4—4 of Fig. 3.

Figure 5 is a transverse vertical sectional elevation through the required parts of the bushing fixture during the construction thereof including the wire sealing ring.

Figure 6 is a transverse vertical sectional elevation taken through the assembled parts of the bung fixture with the wire sealing ring secured in position against removal.

Referring by numerals to the accompanying drawing, the wall stock 7 is provided with an embossment 8 having an outwardly extending neck 9 and the threads 10 of which may be pressed, swedged or rolled into the interior threads 11 of the collar 12, in the manner or method shown and described in U. S. Letters Patent No. 2,207,564, which issued to me July 9, 1940.

The collar 12 may be stamped or otherwise formed from black steel or analogous material, and while being circular in shape is provided with an inverted cone-shaped outer wall 13 and consequently is of less diameter across its inner end than at its outer end.

A wire sealing ring 14 having a vertically extending wall 15 and a horizontally extending wall 16 is held in secured position around the collar 12 by the tapered surface of the outer wall 13 of the collar.

When the collar 12 has been mounted on the threaded extending neck 8 and secured thereto and the wire sealing ring 14 has been mounted over the collar, the bushing or bung fixture 17 for the closure plug 18, has been provided on the wall 7 of a sheet metal container.

In assembling the bushing fixture 17 with the wire sealing ring 14 forming a part thereof, the ring 14 is mounted over the extending neck 9 of the wall 7 and is positioned with the horizontal wall 16 of the ring against the embossment 8 of the wall 7 for concentric engagement of the inner end 19 of the collar 12 so that said inner end of the collar which is smaller in diameter than the vertical annular wall 15 of the ring, can be engaged within the confines of the wall 15.

So that the inner end 19 of the collar 12 can be aptly entered within the wall 15 of the ring 14, it is rounded or tapered as shown at 20 and by the use and application of the required means (not shown), the collar 12 is forced within the annular wall 15 of the ring its entire length and the inner end 19 of the collar 12 will be engaged against the embossment 8 of the wall 7, as shown in Figs. 5 and 6.

The forcing of the collar 12 within the wall 15 of the ring 14 will flare said wall outwardly, as shown at 21, and in conformity with the inverted cone-shape of the outer wall 13 of the collar, and when the operation of flanging-over the extending end 22 of the neck 9 into the annular recessed seat 23 on the outer end of the collar 12, has been completed, the ring 14 cannot be removed from the collar and/or the bushing fixture 17, as shown in Fig. 6.

After the bung fixture 17 has been assembled as indicated with respect to the disclosure in Fig. 6, the threads 10 as shown in Fig. 1, are formed in the wall of the neck 9 by rolling and the like, as described in my Letters Patent No. 2,207,564.

The sealing ring 14 is provided with a pair of apertured ears 24 and the flange 25 of the plug 18 is provided with an apertured ear 26 and when the bushing fixture 17 is closed by the threads of the plug 18 being screwed into the threads 10 of the fixture for tightly seating the gasket 27 on the outer end of the collar 12, a wire 28 of a sealing element 29 is engaged through an aperture of one of the ears 24 of the ring 14 and the aperture of the ear 26 of the plug, for sealing purposes and as indicated.

The flaring of the vertical wall 15 of the ring 14 by the pressing of the collar 12 therein and the permanent securing of the collar on the neck 9 may secure the ring from being turned on the collar, but in the event the ring did turn on the collar, the ring nevertheless will be secured against removal from the bushing fixture and in fact, the turning or moving of the ring on the collar will provide for positioning one of the apertured ears 24 in proximity to the apertured ear 26 of the closure plug 18, for enhancing seal wire engagement.

Obviously, the peculiar formation of the outer wall 13 of the collar 12 and the manner in which it is designed to cooperate with the wire sealing ring 14, provides for a simple and durable sealing ring which forms part of a bushing fixture for a sheet metal container.

What I claim is:

1. The method of constructing a bushing fixture in a sheet metal wall for a container, consisting of forming a neck around an opening in a wall of the container, mounting a wire seal ring over said neck, of engaging the small end of a tapered collar over said neck and in said ring, of pressing the collar in said ring to abut the small end of the collar against the wall and for outwardly flaring the ring, and of securing the neck to the collar.

2. The method of constructing a bushing fixture in a sheet metal wall for a container, consisting of forming an extending neck around an opening in a wall of the container, of mounting a vertical walled seal ring member over the neck, of positioning an inverted cone-shaped collar over the neck with its small end innermost and pressing it into the ring member to flare the ring, and of flanging the free end of the neck over the outer end of the collar.

3. The method of constructing a bushing fixture in a sheet metal wall for a container, consisting of stamping an opening in the wall, of forming an outwardly extending neck from the surrounding material of the wall opening, of loosely mounting a sealing ring over the neck, and of engaging the small end of a tapered collar between the neck and the ring and pressing the collar therebetween to engage its small end against the wall and to flare the ring, and of flanging the free end of the neck over the collar to secure the collar and the ring.

4. The method of constructing a bushing fixture in a sheet metal wall for a container, consisting of stamping an opening in the wall, of forming an outwardly extending neck from the surrounding material of the wall opening, of loosely mounting a sealing ring over the neck, of engaging the small end of a tapered collar between the neck and the ring and pressing the collar therebetween to engage its small end against the wall, and of flanging the free end of the neck over the outer end of the collar.

LOUIS B. WACKMAN.